(12) United States Patent
Bach

(10) Patent No.: US 11,140,869 B2
(45) Date of Patent: Oct. 12, 2021

(54) ROPING PRACTICE APPARATUS AND METHOD

(71) Applicant: Smart Roping, LLC, Mt. Pleasant, TX (US)

(72) Inventor: Allen Bach, Mt. Pleasant, TX (US)

(73) Assignee: Smart Roping, LLC, Mount Pleasant, TX (US)

( * ) Notice: Subject to any disclaimer, the term of this patent is extended or adjusted under 35 U.S.C. 154(b) by 307 days.

(21) Appl. No.: 15/802,234

(22) Filed: Nov. 2, 2017

(65) Prior Publication Data

US 2018/0116176 A1    May 3, 2018

Related U.S. Application Data

(60) Provisional application No. 62/416,518, filed on Nov. 2, 2016.

(51) Int. Cl.
| | |
|---|---|
| *A01K 15/02* | (2006.01) |
| *A63B 69/00* | (2006.01) |
| *A01K 15/00* | (2006.01) |
| *A63B 69/04* | (2006.01) |
| *A63B 71/06* | (2006.01) |

(52) U.S. Cl.
CPC ............ *A01K 15/02* (2013.01); *A01K 15/003* (2013.01); *A63B 69/0068* (2013.01); *A63B 69/04* (2013.01); *A63B 71/0622* (2013.01); *A63B 2071/0694* (2013.01); *A63B 2220/62* (2013.01)

(58) Field of Classification Search
CPC ....................... A63B 69/0068; A63B 71/0622; A01K 15/02; A01K 15/003; F41J 9/02

USPC ......................................................... 119/839
See application file for complete search history.

(56) References Cited

U.S. PATENT DOCUMENTS

| | | |
|---|---|---|
| 3,776,553 A | 4/1973 | Kelton |
| 3,802,706 A | 4/1974 | Hamm |
| 3,947,033 A | 3/1976 | Bennett |
| 4,239,259 A * | 12/1980 | Martinez ................ A47D 1/004 280/649 |
| 4,451,045 A | 5/1984 | Fesmire |
| 4,640,515 A | 2/1987 | Rhine |
| 4,874,179 A | 10/1989 | Henderson |
| 5,009,432 A | 4/1991 | Richard |

(Continued)

OTHER PUBLICATIONS

International Search Report and Written Opinion of United States Patent Office dated Jan. 12, 2018, 10 pp.

(Continued)

*Primary Examiner* — Laura Davison
(74) *Attorney, Agent, or Firm* — Edwin S. Flores; Chalker Flores, LLP

(57) ABSTRACT

The present invention includes a mechanical roping apparatus and method for practicing animal roping, the apparatus comprising: an animal assembly that provides an up and down motion and simulates a hopping motion by the animal; a leg assembly mounted at the rear of the frame wherein the leg members are movable with respect to the frame and simulate a running motion; an actuation assembly to move the leg members from a forward position to a rear position; and one or more indicia that indicates to the user when the leg members are in an optimal position for roping, and then they are not accessible for roping and then the legs are accessible for roping.

18 Claims, 3 Drawing Sheets

(56) References Cited

U.S. PATENT DOCUMENTS

| | | | |
|---|---|---|---|
| 5,080,373 A | 1/1992 | Jones | |
| 5,325,817 A * | 7/1994 | Huffman | A01K 15/02 |
| | | | 119/839 |
| 5,333,895 A * | 8/1994 | Fujan | B60G 5/00 |
| | | | 180/22 |
| 5,568,926 A | 10/1996 | Kaptein | |
| 5,709,386 A | 1/1998 | Nelson et al. | |
| 5,816,578 A | 10/1998 | Frankamp | |
| 6,364,324 B1 | 4/2002 | Buchanan | |
| 6,422,945 B1 * | 7/2002 | Okita | A63B 69/32 |
| | | | 463/49 |
| 6,457,757 B2 * | 10/2002 | Hendrick | E01H 5/02 |
| | | | 294/53.5 |
| 7,293,775 B1 | 11/2007 | Donnelly | |
| 7,430,990 B1 | 10/2008 | Copenhaver | |
| 8,342,978 B2 * | 1/2013 | Tamura | A63B 24/0021 |
| | | | 463/30 |
| 8,783,689 B1 | 7/2014 | Copenhaver | |
| 9,072,961 B2 * | 7/2015 | Stellenberg | A63F 7/027 |
| 9,129,534 B2 * | 9/2015 | Payne | G09B 19/003 |
| 9,533,209 B1 * | 1/2017 | Copenhaver | A63B 69/00 |
| 2004/0108345 A1 * | 6/2004 | Oh | A45C 9/00 |
| | | | 224/153 |
| 2004/0154854 A1 * | 8/2004 | Stephens | B62D 21/183 |
| | | | 180/291 |
| 2005/0282128 A1 * | 12/2005 | Brinkerhoff | A63B 69/0068 |
| | | | 434/247 |
| 2006/0170163 A1 | 8/2006 | Perkins | |
| 2009/0014960 A1 | 1/2009 | Brackens | |
| 2014/0193785 A1 | 7/2014 | McCarthy | |
| 2014/0261237 A1 | 9/2014 | Payne | |
| 2016/0029596 A1 * | 2/2016 | Bruegman | A63B 69/0068 |
| | | | 119/839 |
| 2017/0270819 A1 | 9/2017 | Stephens | |

OTHER PUBLICATIONS

International Search Report and Written Opinion for PCT/US2021/021616 by United States Patent Office dated Apr. 22, 2021, 9 pp.

Heel-O-Matic, "HOX" roping device, http://www.heelomatic.com/product/hox/, archived Oct. 2, 2015 (Year: 2015).

* cited by examiner

ROPING PRACTICE APPARATUS AND METHOD

CROSS-REFERENCE TO RELATED APPLICATIONS

This application claims priority to U.S. Provisional Application Ser. No. 62/416,518, filed Nov. 2, 2016, the entire contents of which are incorporated herein by reference.

STATEMENT OF FEDERALLY FUNDED RESEARCH

None.

TECHNICAL FIELD OF THE INVENTION

The present invention relates in general to the field of roping practice devices, and more particularly, to a novel rodeo training apparatus and method for rope training with indicia that direct the user when to lasso the legs of the animal.

BACKGROUND OF THE INVENTION

Without limiting the scope of the invention, its background is described in connection with roping practice devices.

One such invention is taught in U.S. Pat. No. 3,947,033, issued to Bennett and entitled, "Steer roping training device." Briefly, this inventor teaches a mechanical device having the general appearance of a steer for use in practicing steer roping. The device consists of a base section having a pair of spaced wheels mounted at the back thereof and a body section having at least one wheel mounted at the front, and the base and body sections are interconnected so as to permit pivotal movement of the body section relative to the base section about a horizontal axis to give the body section a life-like lean attitude when roped by the horns and towed by a horse.

Another such invention is taught in U.S. Pat. No. 7,293,775, issued to Donnelly entitled "Roping practice apparatus". Briefly, this inventor teaches a roping practice apparatus that includes a simulated steer assembly for roping practice, having a base with a vertical support mechanism mounted on the base; a body mounted on the vertical support mechanism and having a front end, a back end, a left side and a right side; legs mounted on the back end of the body; a head portion mounted on the front end so that the head pivots toward the left side when roped; a rocker arm mounted on the vertical support mechanism; a spring and cable system connecting each of the legs to the rocker arm for moving the legs backward and forward; and a power source operatively connected to the rocker arm. The assembly may be towed or may be radio-controlled.

Another such invention is taught in U.S. Pat. No. 8,783,689, issued to Copenhaver and entitled, "Steer roping practice apparatus with enhanced leg roping simulation." Briefly, this inventor teaches a mechanical roping steer apparatus for practicing roping of a steer and may comprise a steer assembly having a front and a rear. The steer assembly comprised a frame and a leg assembly mounted on the frame and including at least one leg member being movable with respect to the frame, the at least one leg member having a lower end movable along an arc. The steer apparatus also comprises an actuation assembly configured to engage a ground surface below the steer assembly and move the at least one leg member when the steer assembly is moved across the ground surface. The steer apparatus may also include a rope deflection assembly configured to deflect a rope from looping about the at least one leg member for at least a forward portion of the arc of movement of the leg lower end.

Another such invention is taught in U.S. Patent Publication No. 20140193785, filed by McCarthy, and entitled "Roping Dummy Apparatus." Briefly, this applicant teaches a team roping dummy that encourages more correct roping. The dummy has a relatively compact main body with collapsible legs, removable head, and internal body storage for head. In order to aid in the rope's loop expansion and ease of removal, the legs collapse toward one another under the pressure of a tightened rope, and re-expand after rope is loosened. The back legs extend at proper angle of heel loop swing, causing the roper to match the angle of the loop during its swing to the angle of the legs and provides a visual line to match the plane of the loop. The dummy has removable and rotatable horns allowing for different horn sizes, shapes, and angles.

SUMMARY OF THE INVENTION

In one embodiment, the present invention includes a mechanical roping apparatus for practicing animal roping, the apparatus comprising: an animal assembly having a front, a rear, and a pivot that provides an up and down motion at the rear of the animal assembly to simulate a hopping motion by the animal; a leg assembly mounted at the rear of the frame and including leg members that are movable with respect to the frame to simulate a running motion; an actuation assembly configured to move the leg members from a forward position when the leg members touch the ground, during a stride such that the legs are in contact with the ground until they reach a rear facing position and the leg members are raised from the ground and kick; and the leg members are off the ground from the rear position to the front position; and one or more indicia that indicates to the user when the leg members are in an optimal position for roping. In one aspect, the indicia are selected from at least one of a visual, an auditory, or a vibrational cue. In another aspect, the indicia are an auditory or a vibrational cue that is carried by the user. In another aspect, the indicia indicates when the leg members are not in an optimal position for roping. In another aspect, the indicia is visual and is selected from a light, a colored light, an LED, an OLED, is a light that changes colors, the light traverses from the top to the bottom of a string of lights and vice versa, the lights are red and green, the light is intermittent, the light dims and intensifies, or the light pulses to indicate the correct time to rope the leg members. In another aspect, the leg members are defined further as comprising an ankle and a hock, wherein a visible indicia is positioned between the ankles and the hock, between the ankles and the rear of the animal assembly, between the hock and the rear of the animal assembly, on the rear of the animal assembly, or combinations thereof. In another aspect, the leg assembly is configured such that the lower end of at least one of the legs of the leg members contacts the ground surface for at least a portion of an arc of movement of the leg lower end in a manner that prevents a rope from looping about the at least one leg. In another aspect, at least one of the leg members comprises a foot extension member extending from the lower end of the at least one leg member for contacting the ground surface during at least a portion of the generally pivotal movement of the leg members. In another aspect, the leg members are coated or wrapped with a surface that simulates the hide of the animal. In another aspect, the indicia is turned on when the leg members are about the most rearward position and the indicia turns off at the top of the hop when the leg members are generally perpendicular to the ground. In another aspect, a hopping motion of the animal assembly, the forward and rearward movement of the leg members, or both, is driven mechanically, hydraulically, pneumatically, magnetically, or electrically. In another aspect, the animal assembly further comprises removable and rotatable horns at the front of the animal assembly allowing for different horn sizes, shapes, and angles. In another aspect, the animal assembly is pulled from a tow bar or is self-propelling. In another aspect, a wheel assembly is positioned at the front of the animal assembly in contact with the ground, and 2, 3, or 4 wheels are positioned to the right, left, or both of a longitudinal centerline of the animal. In another aspect, the animal is bovine, ovine, equine, or swine. In another aspect, the actuation assembly includes: a wheel rotatably mounted on the frame in contact with the ground; and a linkage connecting the wheel to the leg assembly such that rotation of the wheel by the ground when the animal assembly is moved over the ground surface is transferred to the leg assembly to pivot the at least one leg member.

In another embodiment, the present invention includes a method for practicing animal roping comprising: providing an animal assembly, the animal assembly having: a front, a rear, and a pivot that provides an up and down motion at the rear of the animal assembly to simulate a hopping motion by the animal; a leg assembly mounted at the rear of the frame and including one or more leg members that are movable with respect to the frame to simulate a running motion; an actuation assembly configured to move the leg members from a forward position when the leg members touch the ground, during a stride such that the legs are in contact with the ground until they reach a rear facing position and the leg members are raised from the ground and kick; and the leg members are off the ground from the rear position to the front position; and one or more indicia that indicates to the user when the leg members are in an optimal position for roping, and then they are not accessible for roping and then the legs are accessible for roping; pulling the animal assembly to simulate the running motion of the animal; and providing the indicia at the optimal position for roping the leg members. In one aspect, the indicia are selected from at least one of a visual, an auditory, or a vibrational cue. In another aspect, the indicia are an auditory or a vibrational cue that is carried by the user. In another aspect, the indicia shows when the leg members are not in an optimal position for roping. In another aspect, the indicia is visual and is selected from a light, a colored light, an LED, an OLED, is a light that changes colors, the light traverses from the top to the bottom of a string of lights and vice versa, the lights are red and green, the light is intermittent, the light dims and intensifies, or the light pulses to indicate the correct time to rope the leg members. In another aspect, the leg members are defined further as comprising an ankle and a hock, wherein a visible indicia is positioned between the ankles and the hock, between the ankles and the rear of the animal assembly, between the hock and the rear of the animal assembly, on the rear of the animal assembly, or combinations thereof. In another aspect, the leg assembly is configured such that the lower end of at least one of the legs of the leg members contacts the ground surface for at least a portion of an arc of movement of the leg lower end in a manner that prevents a rope from looping about the at least one leg. In another aspect, at least one of the leg members comprises a foot extension member extending from the lower end of the at least one leg member for contacting the ground surface during at least a portion of the generally pivotal movement of the leg members. In another aspect, the leg members are coated or wrapped with a surface that simulates the hide of the animal. In another aspect, the indicia is turned on when the leg members are about the most rearward position and the indicia turns off at the top of the hop when the leg members are generally perpendicular to the ground. In another aspect, the hopping motion of the animal assembly, the movement of the leg members, or both, is driven mechanically, hydraulically, pneumatically, or electrically. In another aspect, the animal assembly further comprises removable and rotatable horns at the front of the animal assembly allowing for different horn sizes, shapes, and angles. In another aspect, the animal assembly is pulled from a tow bar or is self-propelling. In another aspect, a wheel assembly is positioned at the front of the animal assembly in contact with the ground, and 2, 3, or 4 wheels are positioned to the right, left, or both of a longitudinal centerline of the animal. In another aspect, the animal is bovine, ovine, equine, or swine. In another aspect, the actuation assembly includes: a wheel rotatably mounted on the frame in contact with the ground; and a linkage connecting the wheel to the leg assembly such that rotation of the wheel by the ground when the animal assembly is moved over the ground surface is transferred to the leg assembly to pivot the at least one leg member.

In another embodiment, the present invention includes a mechanical steer roping apparatus for practicing steer roping, the apparatus comprising: a steer assembly having a front, a rear, and a pivot that provides an up and down motion at the rear of the steer assembly to simulate a hopping motion by the steer; a leg assembly mounted at the rear of the frame and including leg members that are movable with respect to the frame to simulate a running motion; an actuation assembly configured to move the leg members from a forward position when the leg members touch the ground, during a stride such that the legs are in contact with the ground until they reach a rear facing position and the leg members are raised from the ground and kick; and the leg members are off the ground from the rear position to the front position; and one or more indicia that indicated to a user when the leg members are in an optimal position for roping, wherein the optimal position for roping the legs and when the indicia shows the optimal position is when the legs are fully extended until the leg members are perpendicular to the ground as the leg members to the ground during a hop.

In another embodiment, the present invention includes a method of making a mechanical steer roping apparatus for practicing steer roping, the apparatus comprising: providing a steer assembly having a front, a rear, and a pivot that provides an up and down motion at the rear of the steer assembly to simulate a hopping motion by the steer; adding a leg assembly mounted at the rear of the frame and including leg members that are movable with respect to the frame to simulate a running motion; including an actuation assembly configured to move the leg members from a forward position when the leg members touch the ground, during a stride such that the legs are in contact with the ground until they reach a rear facing position and the leg members are raised from the ground and kick; and the leg members are off the ground from the rear position to the front position; and positioning one or more indicia that indicates to a user when the leg members are in an optimal position for roping, wherein the optimal position for roping the legs and when the indicia shows the optimal position is when the legs are fully extended until the leg members are perpendicular to the ground as the leg members to the ground during a hop.

In another embodiment, the present invention includes a mechanical roping apparatus for practicing steer roping of an animal, the apparatus comprising: a steer assembly having a front, a rear, and a pivot that provides an up and down motion at the rear of the animal assembly to simulate a hopping motion by the animal; a leg assembly mounted at the rear of the frame and including leg members that are movable with respect to the frame to simulate a running motion; an actuation assembly configured to move the leg members from a forward position when the leg members touch the ground, during a stride such that the legs are in contact with the ground until they reach a rear facing position and the leg members are raised from the ground and kick; and the leg members are off the ground from the rear position to the front position; and a wheel assembly positioned at the front of the animal assembly in contact with the ground, and 2, 3, or 4 wheels are positioned to the right, left, or both of a longitudinal centerline of the animal.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention improves on known steer roping practice devices by providing the trainee with indicia of the best time to rope the hind legs of an animal. The hind legs of the mechanical roping practice apparatus are generally roped or lassoed when the hind leg or legs are moving along a forward portion of the arc of movement, during a hop, until the rear legs are perpendicular to the ground as the legs move forward. Even when it is possible to rope the hind legs at a position forward from the position at which the rear legs are perpendicular to the ground, it is not considered to be good roping technique. The present invention can be used for a wide variety of roping applications. While the examples herein are shown with a steer as an exemplary animal, many other animals for which roping practice may be sought are also encompassed by the present invention, such as but not limited to, bovine, ovine, equine, swine, which animals can be young or full grown. The present invention is shown using a steer as an example, and the present invention includes mechanical training devices for any animal for which roping practice is sought.

Unlike other known steer roping practice devices, in one embodiment the present invention provides a combination of movement of the legs along the ground and in the air, while at the same time mimicking the jumping motion of the steer. The present invention provides the indicia of when the proper roping technique is used by indicating the correct time to rope the hind leg or legs, and then turns off when the incorrect time for roping is indicated. Therefore, the user and observers of the roping practice can track if proper technique is applied, but also when the hind leg or legs are roped, reflecting incorrect roping technique.

Figure 1:
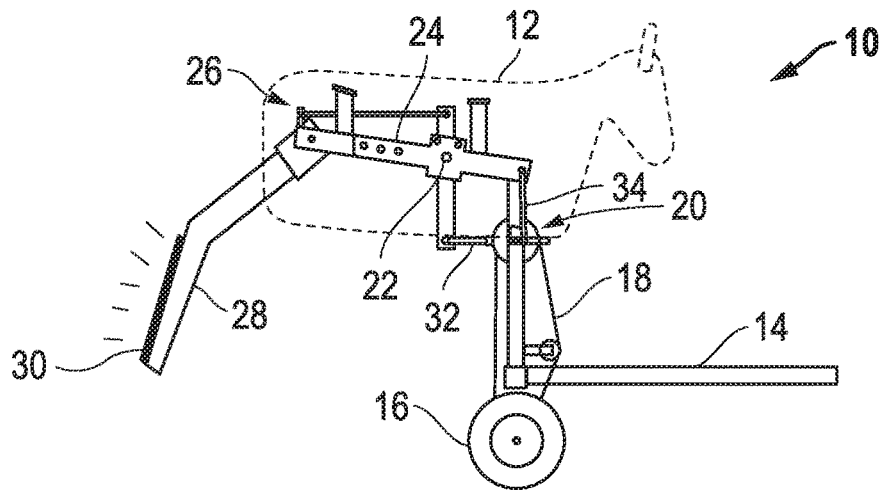
FIG. 1 shows a side view of a mechanical roping steer of the present invention in a first position at the end of a stride.

FIG. 1 shows a side view of a mechanical roping steer apparatus 10 of the present invention in a first position at the end of a stride and the internal mechanisms therein. The body 12 of the mechanical roping steer apparatus 10 may include, e.g., the rest of the body of the steer such as horns and optionally front legs (not depicted). The mechanical roping steer apparatus 10 can include a tow bar 14 and a wheel or wheels 16. The wheel or wheels 16 are connected via a belt 18 to a pulley system 20. The wheel or wheels 16, belt 18, and pulley system 20 further control both the up and down motion of the body 12 along frame 24 of the steer via pivot 22, but also the motion via pivot 26 of the hind leg or legs 28. During this portion of the jump and leg extension cycle, the lights 30 are in the on position, which indicates to the user that this is the proper time to rope the hind leg or legs 28 if following proper roping technique.

The indicium shown in the figures is light, however, the skilled artisan will recognize that sound or vibration may also be used as one of the indicia, which indicia are not mutually exclusive, that is, more than one indicium may be used at the same and/or different times. Any variation of the same is encompassed by the present invention, as are various positions (for visual cues) for the indicium. If using sound, for example, the sound can be varied to indicate the proper time to rope the hind leg or legs 28, such as using a tone that changes pitch, intermittent sound that indicates with an increase in pitch or volume, or the presence or absence of sound, or any combination thereof, to indicate to the user when is the best time in the cycle to rope the hind leg or legs 28. The volume of the sound and/or intensity or rate of intermittent sound may be used to indicate to the user when the proper time is approaching, during the duration of the proper roping time, when the time is ending, and when it is not proper technique to rope. Likewise, the light or visual cue can be varied in similar manner, e.g., with the lights on or off, with a change in the rate of blinking of the light(s), by having a red (no-go) versus green (go), or even a spectrum of color and/or intensity to indicate to the user when the proper time is approaching, during the duration of the proper roping time, when the time is ending, and when it is not proper technique to rope. An example of a visual cue includes an indicator that has up or down arrows, a flag, a wheel with one color for go and another for stop, stop and go signaling, or other indicator whether mechanical or in the form of a light (or both light and mechanical) that can be seen by the user during roping practice. Another indicium is vibration, which could be a device carried or worn by the user (non-limiting examples including a smartphone, a smartwatch, and/or other dedicated device) that provide the user with vibration that indicates to the user when the proper time is approaching, during the duration of the proper roping time, when the time is ending, and when it is not proper technique to rope.

Figure 2:
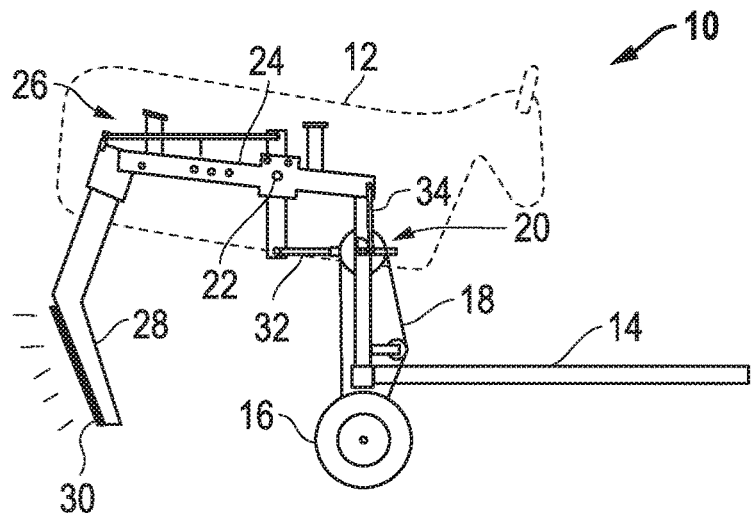
FIG. 2 shows a side view of a mechanical roping steer of the present invention in a second position as the legs move from the rear toward the front.

FIG. 2 shows a side view of a mechanical roping steer apparatus 10 of the present invention in a second position as the steer apparatus is jumping and the hind leg or legs 28 are moving toward the forward position and showing the lights 30 on until the legs reach the point in the cycle when it is improper technique to rope the hind leg or legs 28.

Figure 3:
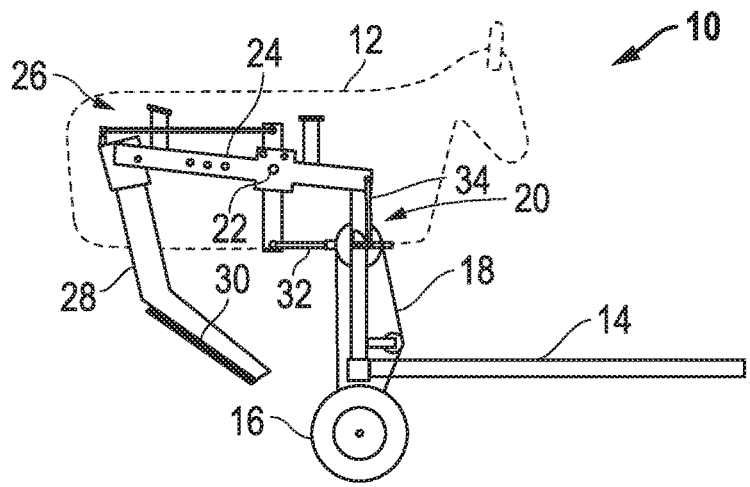
FIG. 3 shows a side view of a mechanical roping steer of the present invention in a third position with the hip halfway down and the legs are all the way forward.

FIG. 3 shows a side view of a mechanical roping steer apparatus 10 of the present invention in a third position with the hip halfway down and the legs are all the way forward, that is, when the hind leg or legs 28 are in the forward position and the frame 24 has brought the hind leg or legs 28 in contact with the ground and roping is not proper and/or possible.

Figure 4:
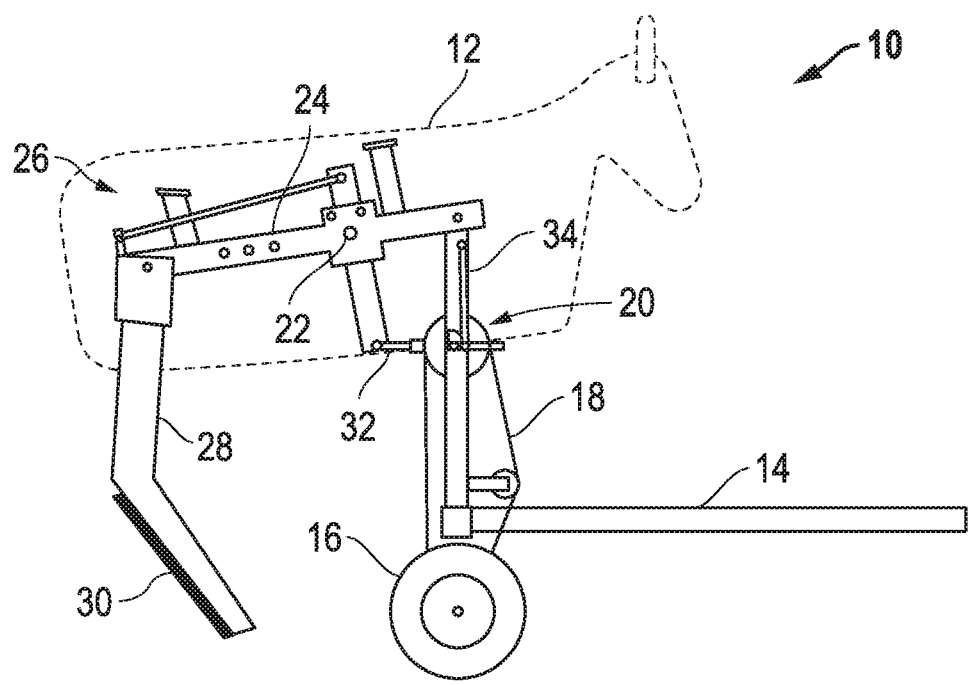
FIG. 4 shows a side view of a mechanical roping steer of the present invention in a fourth position where the hip is all the way down and the legs are mid stride.

FIG. 4 shows a side view of a mechanical roping steer apparatus 10 of the present invention in a fourth position where the hip 26 is all the way down and the hind leg or legs 28 are mid stride moving from front to back.

When viewed together, FIGS. 1 to 4 show that as the mechanical roping steer apparatus 10 is towed the wheel or wheels 16 turn the belt 18, which turns the pulley system 20. Two arms 32, 34 are attached to the pulley system 20 and one arm 32 makes legs travel forward/backwards and the other arm 34 makes the hip 26 move up/down. The mechanical roping steer apparatus 10 pivots in the middle (pivot 22) of the frame 24.

Figure 5:
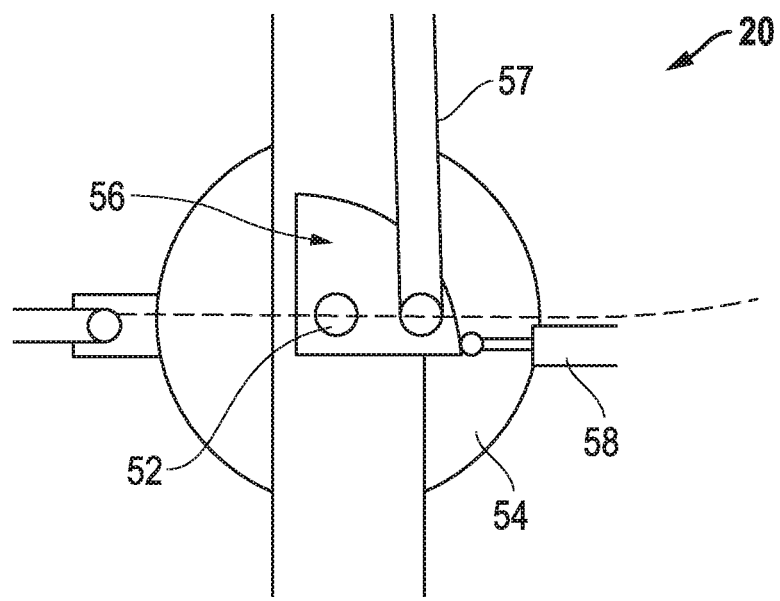
FIG. 5 is a detailed side view of one implementation of the mechanism for controlling the indicia, e.g., lights of the present invention.

FIG. 5 is a detailed side view of one implementation of the pulley system 20 for controlling the indicia, e.g., lights 30 of the present invention. A light switch 58 is triggered by the quarter circle plate 56 on pulley system 20 about a pivot 52, that is on a wheel 54. The wheel 54 can be connected to an arm 57 that transfers motion to other parts of the mechanical roping steer apparatus, such as the pivot that provides for an up and down motion for the mechanical roping steer apparatus that simulates jumping. The indicia in the hind leg or legs come on with hind leg or legs in the fully extended rear position and/or until the top of the hop with hind leg or legs straight down (perpendicular to the ground), at which point the indicia is reduced to zero or eliminated. For example, lights can be located on any part of the hind leg or legs or even the hip, anywhere on the mechanical roping steer apparatus, the horns, the wheels, the tow bar, or even the device pulling the mechanical roping steer apparatus. Generally, the lights will be located in a location that permits the user to best determine the optimal position of the hind leg or legs for roping, e.g., from hock to ankle of leg, the feet, on or about the lower, middle, upper portion of the hind leg or legs.

Figure 6:
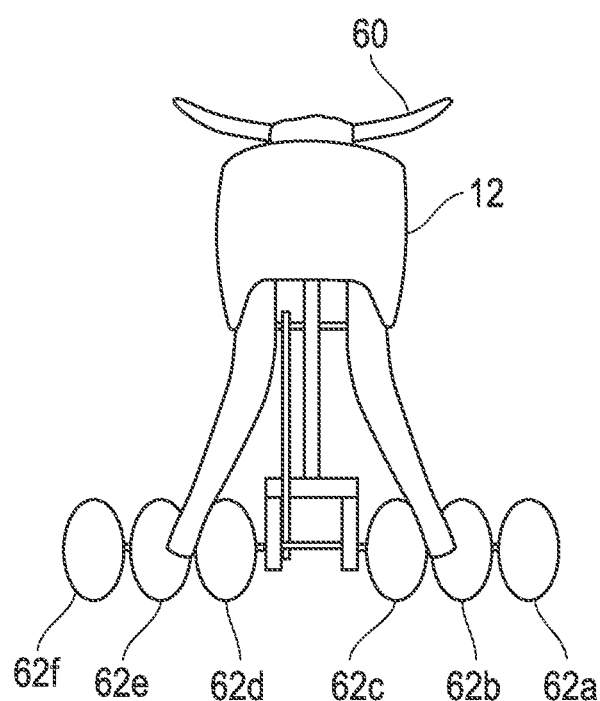
FIG. 6 is a rear view of a mechanical roping steer of the present invention showing a mechanism for increasing the stability of the mechanical roping steer.

FIG. 6 is a rear view of a mechanical roping steer apparatus 60 of the present invention showing a mechanism for increasing the stability of the mechanical roping steer. The mechanical roping steer apparatus 60 depicted is shown from a rear view and includes, in this embodiment, six wheels 62a-62f. It has been found that having more than two wheels provides for increased stability. For example, the mechanical roping steer apparatus 60 can include 3, 4, 5, 6, 7, 8, 9, or even 10 wheels, which wheels can be evenly distributed between the right and left side of the mechanical roping steer apparatus 60, or unevenly distributed to provide more stability to one or the other side. It has been found that the mechanical roping steer apparatus makes the sharpest corners, as would a normal animal, using the extended tire design, e.g., the 6 tire design. It was found that the mechanical roping steer apparatus has a lot more traction throughout the corner. It was further found that when the mechanical roping steer apparatus tilts one way or the other, one tire is always in contact with the ground and prevents the hop from stalling throughout the corner.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s)

or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the apparatuses and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A mechanical roping apparatus for practicing animal roping, the apparatus comprising:
    an animal assembly having a front, a rear, a frame, a first pivot positioned on the frame between a front and a rear of the frame and around which the frame rotates, and a second pivot positioned on the frame at the front of the frame and around which the frame rotates, so that the rear of the animal assembly moves up and down as the frame rotates at least around the first pivot and the second pivot to simulate a hopping motion by an animal;
    a leg assembly mounted at the rear of the frame and including leg members that are movable with respect to the frame to simulate a running motion, wherein each leg member comprises a foot, an ankle, and a hock;
    one or more visual indicia that indicate to a user when the leg members are in an optimal position for roping, wherein the one or more visual indicia (1) are selected from a light, a colored light, an LED, and an OLED; (2) indicate a correct time to rope the leg members by dimming and intensifying; and (3) are positioned in a location on the leg members that permits the user to best determine the optimal position of the leg members during the stride for roping, on the foot of one or more of the leg members, on the ankle of one or more of the leg members, between the ankle and the hock of one or more of the leg members, on the hock of one or more of the leg members, between the ankle of one or more of the leg members and the rear of the animal assembly, between the hock of one or more of the leg members and the rear of the animal assembly, on the rear of the animal assembly, or combinations thereof; and
    an actuation assembly comprising:
        a wheel rotatably mounted on the frame in contact with the ground;
        a linkage connecting the wheel to the leg assembly such that rotation of the wheel by the ground when the animal assembly is moved over the ground surface is transferred to the leg assembly to pivot at least one of the leg members; and
        a switch connected to the one or more visual indicia and configured to operate the one or more visual indicia, wherein the switch is configured to operate as the wheel and the linkage pivot the at least one of the leg members;
        wherein the actuation assembly is configured to move the leg members from a forward position when the leg members touch the ground, during a stride such that the leg members are in contact with the ground until they reach a rear facing position and the leg members are raised from the ground and kick; and the leg members are off the ground from the rear facing position to the forward position.

2. The apparatus of claim 1, wherein the one or more visual indicia show when the leg members are not in an optimal position for roping.

3. The apparatus of claim 1, wherein (1) the leg assembly is configured such that a lower end of at least one of the leg members contacts the ground surface for at least a portion of an arc of movement of the lower end of the at least one leg member in a manner that prevents a rope from looping about the at least one leg member, or (2) at least one of the leg members comprises a foot extension member extending from the lower end of the at least one leg member for contacting the ground surface during at least a portion of a generally pivotal movement of the leg members, or (3) the leg members are coated or wrapped with a surface that simulates a hide of the animal.

4. The apparatus of claim 1, wherein the one or more visual indicia are turned on when the leg members are about at a most rearward position and the one or more visual indicia are turned off at a top of a hop when the leg members are generally perpendicular to the ground.

5. The apparatus of claim 1, wherein the one or more visual indicia show a user when the leg members are in an optimal position for roping, wherein the optimal position for roping the leg members is when the leg members are fully extended until the leg members are perpendicular to the ground as the leg members move forward during a hop.

6. The apparatus of claim 1, wherein the animal assembly further comprises removable and rotatable horns at the front of the animal assembly allowing for different horn sizes, shapes, and angles; or the apparatus is pulled from a tow bar or is self-propelling; or the animal assembly simulates an animal that is bovine, ovine, equine, or swine.

7. The apparatus of claim 1, wherein a wheel assembly comprising a plurality of wheels is positioned at the front of the animal assembly in contact with the ground, and two, three, or four wheels of the plurality of wheels are positioned co-axially along a single axis to the right, left, or both of a longitudinal centerline of the animal assembly.

8. The apparatus of claim 1, further comprising one or more one auditory indicia that indicate to the user when the leg members are in an optimal position for roping or one or more vibrational indicia carried by the user that indicate to the user when the leg members are in an optimal position for roping.

9. A method for practicing animal roping comprising:
providing an animal assembly, the animal assembly having:
a front, a rear, a frame, a first pivot positioned on the frame between a front and a rear of the frame and around which the frame rotates, and a second pivot positioned on the frame at the front of the frame and around which the frame rotates, so that the rear of the animal assembly moves up and down as the frame rotates at least around the first pivot and the second pivot to simulate a hopping motion by an animal;
a leg assembly mounted at the rear of the frame and including one or more leg members that are movable with respect to the frame to simulate a running motion, wherein each leg member comprises a foot, an ankle, and a hock;
one or more visual indicia that indicate to a user when the leg members are in an optimal position for roping, and when the leg members are not accessible for roping and when the leg members are accessible for roping, wherein the one or more visual indicia (1) are selected from a light, a colored light, an LED, and an OLED; (2) indicate a correct time to rope the leg members by dimming and intensifying; and (3) are positioned in a location on the leg members that permits the user to best determine the optimal position of the leg members during the stride for roping, on the foot of one or more of the leg members, on the ankle of one or more of the leg members, between the ankle and the hock of one or more of the leg members, on the hock of one or more of the leg members, between the ankle of one or more of the leg members and the rear of the animal assembly, between the hock of one or more of the leg members and the rear of the animal assembly, on the rear of the animal assembly, or combinations thereof; and
an actuation assembly comprising:
a wheel rotatably mounted on the frame in contact with the ground; and
a linkage connecting the wheel to the leg assembly such that rotation of the wheel by the ground when the animal assembly is moved over the ground surface is transferred to the leg assembly to pivot at least one of the leg members; and
a switch connected to the one or more visual indicia and configured to operate the one or more visual indicia, wherein the switch is configured to operate as the wheel and the linkage pivot the at least one of the leg members;
wherein the actuation assembly is configured to move the leg members from a forward position when the leg members touch the ground, during a stride such that the leg members are in contact with the ground until they reach a rear facing position and the leg members are raised from the ground and kick; and the leg members are off the ground from the rear facing position to the forward position;
pulling the animal assembly to simulate the running motion of the animal; and
providing the one or more visual indicia at the optimal position for roping the leg members.

10. The method of claim 9, wherein the one or more visual indicia show when the leg members are not in an optimal position for roping.

11. The method of claim 9, wherein the one or more visual indicia show a user when the leg members are in an optimal position for roping, wherein the optimal position for roping the leg members is when the leg members are fully extended until the leg members are perpendicular to the ground as the leg members move forward during a hop.

12. The method of claim 9, wherein (1) the leg assembly is configured such that a lower end of at least one of the leg members contacts the ground surface for at least a portion of an arc of movement of the lower end of the at least one leg member in a manner that prevents a rope from looping about the at least one leg member; or (2) at least one of the leg members comprises a foot extension member extending from the lower end of the at least one leg member for contacting the ground surface during at least a portion of a generally pivotal movement of the leg members; or (3) the leg members are coated or wrapped with a surface that simulates a hide of the animal.

13. The method of claim 9, wherein the one or more visual indicia are turned on when the leg members are about at a most rearward position and the one or more indicia are turned off at a top of a hop when the leg members are generally perpendicular to the ground.

14. The method of claim 9, wherein the animal assembly further comprises removable and rotatable horns at the front of the animal assembly allowing for different horn sizes, shapes, and angles; or the animal assembly is pulled from a tow bar or is self-propelling; or the animal assembly simulates an animal that is bovine, ovine, equine, or swine.

15. The method of claim 9, wherein a wheel assembly comprising a plurality of wheels is positioned at the front of the animal assembly in contact with the ground, and two, three, or four wheels of the plurality of wheels are positioned co-axially along a single axis to the right, left, or both of a longitudinal centerline of the animal assembly.

16. The method of claim 9, wherein the animal assembly further comprises one or more one auditory indicia that indicate to the user when the leg members are in an optimal position for roping or one or more vibrational indicia carried by a user that indicate to the user when the leg members are in an optimal position for roping.

17. A mechanical roping apparatus for practicing steer roping, the apparatus comprising:
a steer assembly having a front, a rear, a frame, a first pivot positioned on the frame between a front and a rear of the frame and around which the frame rotates, and a second pivot positioned on the frame at the front of the frame and around which the frame rotates, so that the rear of the steer assembly moves up and down as the frame rotates at least around the first pivot and the second pivot to simulate a hopping motion by a steer;
a leg assembly mounted at the rear of the frame and including leg members that are movable with respect to the frame to simulate a running motion, wherein each leg member comprises a foot, an ankle, and a hock;
one or more visual indicia that indicate to a user when the leg members are in an optimal position for roping, wherein the one or more visual indicia (1) are selected from a light, a colored light, an LED, and an OLED; (2) indicate a correct time to rope the leg members by dimming and intensifying; and (3) are positioned in a location on the leg members that permits the user to best determine the optimal position of the leg members during the stride for roping, on the foot of one or more of the leg members, on the ankle of one or more of the leg members, between the ankle and the hock of one or more of the leg members, on the hock of one or more of the leg members, between the ankle of one or more of the leg members and the rear of the steer assembly, between the hock of one or more of the leg members and the rear of the steer assembly, on the rear of the steer assembly, or combinations thereof;

a wheel assembly comprising a plurality of wheels positioned at the front of the steer assembly in contact with the ground, and two, three, or four wheels of the plurality of wheels are positioned co-axially along a single axis to the right, left, or both of a longitudinal centerline of the steer assembly; and an actuation assembly comprising:
  a wheel rotatably mounted on the frame in contact with the ground;
  a linkage connecting the wheel to the leg assembly such that rotation of the wheel by the ground when the steer assembly is moved over the ground surface is transferred to the leg assembly to pivot at least one of the leg members; and
  a switch connected to the one or more visual indicia and configured to operate the one of more visual indicia, wherein the switch is configured to operate as the wheel and the linkage pivot the at least one of the leg members;
wherein the actuation assembly is configured to move the leg members from a forward position when the leg members touch the ground, during a stride such that the leg members are in contact with the ground until they reach a rear facing position and the leg members are raised from the ground and kick; and the leg members are off the ground from the rear facing position to the forward position.

18. The apparatus of claim 17, further comprising one or more one auditory indicia that indicate to the user when the leg members are in an optimal position for roping or one or more vibrational indicia carried by the user that indicate to the user when the leg members are in an optimal position for roping.

* * * * *